United States Patent [19]
Miceli

[11] Patent Number: 5,292,366
[45] Date of Patent: * Mar. 8, 1994

[54] PUMICE CONTAINING COMPOSITION

[76] Inventor: Joseph J. Miceli, 7902 Limoges Dr., Jacksonville, Fla. 32210

[*] Notice: The portion of the term of this patent subsequent to May 21, 2008 has been disclaimed.

[21] Appl. No.: 766,819

[22] Filed: Sep. 26, 1991

[51] Int. Cl.$^5$ .............................................. C04B 14/16
[52] U.S. Cl. .................................... 106/708; 106/711; 106/790; 106/819; 106/823
[58] Field of Search ............... 106/823, 314, 764, 790, 106/819, 708, 711, 716, 763

[56] References Cited

U.S. PATENT DOCUMENTS

| | | | |
|---|---|---|---|
| 4,225,358 | 9/1980 | Maier | 106/823 |
| 5,017,232 | 5/1991 | Miceli | 106/711 |

FOREIGN PATENT DOCUMENTS

| | | | |
|---|---|---|---|
| 2213034 | 10/1972 | Fed. Rep. of Germany | 106/711 |
| 0093615 | 8/1978 | Japan | 106/711 |
| 0014428 | 2/1979 | Japan | 106/711 |
| 0334199 | 4/1972 | U.S.S.R. | 106/708 |
| 1429167 | 3/1976 | United Kingdom | 106/711 |

Primary Examiner—Mark L. Bell
Assistant Examiner—Paul Marcantoni
Attorney, Agent, or Firm—Thomas C. Saitta

[57] ABSTRACT

A composition for forming a waterproof, high strength, hard material having good insulation properties, comprising a mixture of crushed pumice and type S mortar, and preferably refractory additives or fillers, which forms the hard material upon the addition of water and after allowing the mixture to cure. The material has superior insulation properties to conventional compositions formed using portland cement instead of type S mortar.

10 Claims, No Drawings

PUMICE CONTAINING COMPOSITION

BACKGROUND OF THE INVENTION

The invention relates generally to the field of curable compositions for forming an insulating material, as well as the insulating material itself, as used for example in refractory or refrigeration constructions. In particular, the invention relates to the field of such compositions where the resulting material is a block or panel comprised of crushed pumice and type S mortar, and preferably additional fillers or additives.

For ultra-high temperature or ultra-low temperature applications, special construction materials must be used. Many of the normal construction materials such as wood, metal, concrete block or brick are not suitable for such applications. It is necessary to provide a material whose composition enables it to withstand the extreme temperatures. Many such materials are known in the industry. For example, it is well known to use refractory blocks or bricks in fireplace or furnace constructions. These materials have both high temperature resistance and high strength.

A composition which has proven to be successful in these applications includes the use of crushed pumice as an aggregate filler. Pumice is a volcanic stone which is strong yet lightweight. A cubic foot can weigh as little as 24 to 30 pounds, due to the presence of numerous sealed air chambers and pockets within the individual stones. Crushed pumice can range in size from pieces three-quarter inches in diameter to that of a grain of sand. Pumice will actually float in water. Prior to this invention, the pumice has always been mixed with portland cement and formed into blocks, panels or bricks. Portland cement is an hydraulic cement produced by pulverizing clinker consisting essentially of hydraulic calcium silicates, usually containing one or more forms of calcium sulfate as an interground addition. The pumice allows for a block roughly one-third lighter in weight than a block of conventional concrete. The pumice block has high insulation properties due to the entrapped air chambers, and is therefor ideally suited for extreme temperature applications.

To be used in fireplace constructions, pumice block must meet minimum standards regarding both compressive strengths and heat penetration. Additionally, the blocks must be able to withstand long-term and repeated high temperature situations without suffering degradation or deterioration. As it is desirable in construction to minimize the amount, size and weight of construction materials, while still meeting the structural requirements and standards, experimentation is ongoing to develop improved construction compositions utilizing pumice.

It has been discovered that pumice panels or blocks having improved structural and temperature insulation properties can be formed of a new composition as described in U.S. Pat. No. 5,017,232, issued May 21, 1991 to this inventor. The pumice blocks of the new composition allow for the use of thinner blocks than those required under the old composition, while providing increased temperature insulation, higher compressive strengths and lesser degradation under long-term conditions.

That composition comprises the combination of pumice, type S mortar, and glass fibers, which when mixed with water form a hard material after curing. Type S mortar is a specialty masonry cement normally used to join and set bricks or concrete blocks. The type S designation is a standard used in the industry, and certifies that the product meets the required ASTM specifications. The composition can be formed into blocks, panels or bricks of various shapes and sizes for use in construction.

It has now been discovered that certain additives and fillers are compatible with this composition, and provide the finished product with improved properties with regard to temperature parameters, weight and impact resistance. It has also been discovered that for certain use the glass fibers can be left out of the original composition.

BRIEF SUMMARY OF THE INVENTION

The composition comprises the combination of pumice, type S mortar, and preferably additional additives or fillers. The additives are chemical compositions such as zircon, alumina oxide or the like, which increase the high temperature insulating properties of the material. The fillers are volume materials such as plastic or rubber beads, styrofoam, carbon strands, extruded clay, metal needles or the like, which affect the weight of the material, impact resistance or the low temperature insulating properties of the material. In certain cases, the glass fibers may be omitted entirely from the mixture where brittleness is not a concern or where the filler material performs the structural function of the fibers in the final hardened material.

DETAILED DESCRIPTION OF THE INVENTION

The composition comprises pumice and type S mortar. The composition can also comprise pumice, type S mortar and certain additives or fillers, with or without glass fibers, combined and mixed with water to form a curable material. The cured material, in the shape of blocks, panels or bricks, is suitable for use in extreme temperature situations of either high or low temperature. The blocks have high insulating values and high compressive strengths.

The pumice used in the composition is crushed pumice ranging in size from that of a grain of sand up to three-quarters of an inch. The pumice should be of high quality such that impurities are kept to a minimum. The glass fibers are preferably used in the form of short, loose fibers. The glass fibers are added to prevent brittleness in the cured material, and may be omitted where not needed or where certain filler materials accomplish this purpose.

Type S mortar is a specialty cement which meets certain ASTM requirements. The designation is used on various commercially available products. Type S mortar must have a minimum compressive strength at 28 days after curing of 1800 psi. Type S mortar is comprised of, in parts by volume, one part portland cement or portland blast furnace slag cement, at least one-quarter to one-half part hydrated lime, and aggregate material in an amount from two and one-quarter to three times the sum of the other materials. Portland blast furnace slag cement is an intimate and uniform blend of portland cement and fine granulated blast furnace slag produced either by intergrinding portland cement clinker and granulated blast furnace slag or by blending portland cement and finely ground granulated blast furnace slag, in which the slag constituent is between 25 and 65 percent of the weight of the portland blast furnace slag cement. Type S hydrated lime is greater than 95 percent calcium and magnesium oxides and less than 5 percent carbon dioxide, where there are less than 8 percent unhydrated oxides. In addition, type S mortar may contain small amounts of air entraining agents, limestone or other waterproofing materials. Because of the type S mortar, the blocks formed of this composition are waterproof, unlike blocks of standard composition using portland cement.

To form the composition, a premix can be prepared prior to the addition of fillers or additives. In the premix, the preferable combination is approximately two parts by weight of pumice for each one part of type S mortar, with a relatively small amount of glass fibers if such is to be included for structural reasons. For example, approximately 156 pounds of pumice is combined with approximately 78 pounds of type S mortar (the weight of a standard bag). To this is added approximately one ounce of loose glass fibers.

The premix consisting of pumice and type S mortar with no glass fibers can be used as is—the addition of water being all that is necessary to form hardened material. Where desired, fillers or additives to improve properties in the hardened material are added to the premix. For example, common refractory additives such as zircon or alumina oxide are added to the premix. Likewise, common fillers such as plastic beads, rubber, or styrofoam pellets can be added.

To this combination, a suitable amount of water is added to mix the ingredients and initiate the curing process, about five gallons for the weights given above. The mixture is then poured into molds or forms to form the blocks or panels and allowed to cure to form the hard material. It is possible to vary the ratio of pumice to type S mortar from below the 2 to 1 ratio to as much as a 3 to 1 ratio, depending on the particular use, without deleting the improved properties and characteristics of the invention. For the 3 to 1 ratio, approximately 234 pounds of pumice is combined with approximately 78 pounds of type S mortar. In weight percentages, the crushed pumice should be from roughly 60 to 75 percent of the total weight, the type S mortar from roughly 40 to 25 percent, with the glass fibers, if present, being significantly less than 1 percent.

To meet the insulation standards, the standard pumice panels made with portland cement instead of type S mortar are usually from 4 to 6 inches thick. The panels made of the type S mortar composition can be made much thinner. For testing purposes, a standard pumice and portland cement panel four inches thick was used, while panels only three-quarter inches thick were formed from the composition containing type S mortar, with and without fillers or additives. Heat resistance and degradation were tested by direct application of a flame blow torch to the surface of each panel. The standard panel showed no heat penetration with flame temperatures of between 1800 to 2000 degrees after one to one and a half hours. The type S panels had only slight heat penetration under the same conditions, even though the type S panel is less than one-fifth the thickness of the standard panel.

With regard to degradation and deterioration, the differences are even more significant. The standard panel shows deterioration after being subjected to the flame for only one hour. The surface becomes chalky, flakes off and minute cracks are observable. After five similar tests, the four inch panel actually cracks apart. In contrast, the three-quarter inch type S panel shows no chalking and no surface cracking after 20 tests of direct flame application of 1800 to 2000 degrees. The type S panel with a 30 weight percent zircon additive showed no degradation upon direct flame application of over 3000 degrees. The type S panel with 30 weight percent alumina oxide additive showed no degradation upon direct flame application of over 3500 degrees.

In tests with filler materials, the panels showed marked improvement over other materials and non-filled type S panels with regard to low temperature insulation properties. Panels filled with plastic beads, rubber or styrofoam up to about 50 volume percent showed a 20 percent improvement over styrofoam panels and a 60 percent improvement over non-filled type S panels. Furthermore, these fillers resulted in panels weighing significantly less.

Another filler material used were steel needles, added at approximately 3 weight percent. This filler increased the compressive strength of the panels from 2440 psi for a non-filled type S panel to 3500 psi for the type S panel containing the steel needles.

The type S composition is vastly superior to the standard pumice composition and to standard concrete compositions in structural strength and insulation values, allowing the use of smaller size and volume construction components without sacrificing structural integrity and insulation standards. The type S composition is waterproof, whereas the others are not. The above examples are by way of illustration only, and the true scope and definition of the invention is to be as set forth in the following claims.

I claim:

1. A composition for forming a high strength, hard material with good insulation properties upon the addition of water, comprising a mixture of crushed pumice, type S mortar and a refractory additive, where the weight of the combination of crushed pumice and type S mortar is greater than approximately 70 weight percent of the total weight of the mixture, and where the weight of the refractory additive is less than approximately 30 weight percent of the total weight of the mixture, and where the weight of the crushed pumice is between 60 to 75 weight percent of said combination of crushed pumice and type S mortar, and where the weight of the type S mortar is between 25 to 40 percent of said combination of crushed pumice and type S mortar.

2. A composition for forming a high strength, hard material with good insulation properties upon the addition of water, comprising a mixture of crushed pumice, type S mortar and a filler material, where the weight of the combination of crushed pumice and type S mortar is greater than approximately 70 weight percent of the total weight of the mixture, and where the weight of the filler material is less than approximately 30 weight percent of the total weight of the mixture, and where the weight of the crushed pumice is between 60 to 75 weight percent of said combination of crushed pumice and type S mortar, and where the weight of the type S mortar is between 25 to 40 percent of said combination of crushed pumice and type S mortar.

3. The composition of claim 1, where the refractory additive is zircon.

4. The composition of claim 1, where the refractory additive is alumina oxide.

5. The composition of claim 2, where the filler material is plastic.

6. The composition of claim 2, where the filler material is styrofoam.

7. The composition of claim 2, where the filler material is rubber.

8. The composition of claim 2, where the filler material is metal.

9. The composition of claim 1, further comprising glass fibers.

10. The composition of claim 2, further comprising glass fibers.

* * * * *